(12) United States Patent
Kumagai et al.

(10) Patent No.: US 6,734,412 B2
(45) Date of Patent: May 11, 2004

(54) POSITION DETECTION DEVICE

(75) Inventors: Kaoru Kumagai, Tokyo (JP); Fumio Ohtomo, Tokyo (JP)

(73) Assignee: Kabushiki Kaisha TOPCON (JP)

( * ) Notice: Subject to any disclaimer, the term of this patent is extended or adjusted under 35 U.S.C. 154(b) by 223 days.

(21) Appl. No.: 10/108,080

(22) Filed: Mar. 27, 2002

(65) Prior Publication Data

US 2002/0153470 A1 Oct. 24, 2002

(30) Foreign Application Priority Data

Mar. 29, 2001 (JP) ........................................ 2001-097486

(51) Int. Cl.$^7$ .......................... G01C 21/24; G01C 3/08; G01C 1/00; G01V 8/00
(52) U.S. Cl. ............................ 250/206.2; 250/559.38; 356/4.07; 356/5.03; 356/139.01
(58) Field of Search .......................... 250/206.2, 208.2, 250/214 R, 214 B, 221, 203.6, 205, 559.29, 559.38, 208.1; 356/4.07, 5.03, 5.04, 139.01

(56) References Cited

U.S. PATENT DOCUMENTS

| | | | | |
|---|---|---|---|---|
| 3,649,124 A | * | 3/1972 | Takaoka et al. | ............ 356/5.04 |
| 4,642,451 A | * | 2/1987 | Tsunekawa et al. | .......... 250/205 |
| 5,694,203 A | * | 12/1997 | Ogawa | ........................ 356/5.04 |
| 6,137,569 A | * | 10/2000 | Sasaki, et al. | ............... 356/153 |
| 6,225,621 B1 | * | 5/2001 | Rogers et al. | ............... 250/221 |
| 2001/0025913 A1 | * | 10/2001 | Tanimoto | .................. 250/208.1 |

* cited by examiner

Primary Examiner—David Porta
Assistant Examiner—David C. Meyer
(74) Attorney, Agent, or Firm—Baker Botts LLP (57) ABSTRACT

The present invention relates to a position detection device having a function of an electronic shutter. The position detection device is devised to perform the following: a light sending means sends out emitted light, which comes from a light emitting means, to a target object; a two-dimensional light receiving means receives reflected light coming from the target object, and converts the reflected light into an electric charge; and an arithmetic processing means determines a position of the target object on the basis of a light receiving signal from the two-dimensional light receiving means. In addition, the two-dimensional light receiving means has a function of an electronic shutter for discharging an accumulated electric charge in order to adjust the quantity of received light. Moreover, the arithmetic processing means can drive the light emitting means within a period of time during which the electronic shutter is stopped and the two-dimensional light receiving means is accumulating an electric charge.

9 Claims, 9 Drawing Sheets

POSITION DETECTION DEVICE

BACKGROUND OF THE INVENTION

The present invention relates to a position detection device, and more particularly to a position detection device in which a two-dimensional light receiving means has a function of an electronic shutter for discharging an accumulated electric charge in order to adjust the quantity of received light, and light is emitted within a period of time during which the electronic shutter is stopped and the two-dimensional light receiving means is accumulating an electric charge.

There is a position detection device that detects a position of a target by emitting light toward the target to receive reflected light. This position detection device is, for example, a tracking device such as a surveying instrument that measures a target position. In this case, the target position is indirectly shown by a prism that reflects tracking light coming from the tracking device such as a surveying instrument.

In addition, the tracking light, which has been emitted by the tracking device such as a surveying instrument, is reflected by a prism located at the target position so that the reflected light is received by a light receiving element mounted on the tracking device. This light receiving element is constituted of a light receiving sensor, and an light receiving optical system for sending reflected light to the light receiving sensor. By imaging received light at a specific position of the light receiving sensor, it is possible to detect and judge whether or not collimation of the tracking device agrees with the target.

There is a four-division sensor as a typical light receiving sensor. This is a sensor whose light receiving area is divided into four with respect to a center of the light receiving sensor. The central position can be detected by comparing the quantity of received light among four areas. A collimation direction of the tracking device is controlled according to this output signal. However, if the collimation direction deviates from the center and thereby light is received in one area, what is found out is only existence of the center in the area.

For example, a tracking device, which uses a four-division sensor, has been developed. This tracking device comprises an amplifier that differentially amplifies outputs of a pair of division elements facing each other in a horizontal direction of a four-division light receiving element, and outputs of a pair of division elements facing each other in a vertical direction, respectively; and a horizontal-direction integrating circuit and a vertical-direction integrating circuit that level an output signal in a horizontal direction, and an output signal in a vertical direction, which have been output from this amplifier, respectively. Tracking is performed by controlling a motor according to the control signals.

In addition, although it is more expensive than the four-division sensor, there is an area sensor that can detect a position at which light is received. This area sensor is constituted of sensor parts that are finely divided in two-dimensional manner. If an object is in a sensor area, this area sensor can detect its position. This sensor is capable of collimation control with a higher degree of accuracy than the four-division sensor. For example, a tracking device, which uses an area sensor, has being developed. A surface of this area sensor is divided into small surface elements so that an incident position of light can be identified in a two-dimensional manner. Tracking becomes possible by controlling and driving a vertical-direction driving device and a horizontal-direction driving device using an arithmetic processing means so that incident light comes into the center of the area sensor.

The four-division sensor and the area sensor as described above are sensors that receive reflected light. Because of it, a tracking range is equivalent to a range within which reflected light can be received. In order to increase the tracking range, it is necessary to increase intensity of emitted tracking light. However, an output limit of the intensity of emitted light is stipulated so that human eyes are not damaged. Therefore, the intensity of emitted light cannot be increased without limitation.

Therefore, efforts to adopt a technology for extending a tracking distance by using pulse light, and a technology for removing noise light by digitizing light receiving data and accumulating the data, are exerted. Nevertheless, because of the output limit of emitted light, there was a problem that a tracking distance cannot be extended dramatically.

SUMMARY OF THE INVENTION

A position detection device according to the present invention is devised to perform the following: a light sending means sends out emitted light, which comes from a light emitting means, to a target object; a two-dimensional light receiving means receives reflected light coming from the target object, and converts the reflected light into an electric charge; and an arithmetic processing means determines a position of the target object on the basis of a light receiving signal from the two-dimensional light receiving means. In addition, the two-dimensional light receiving means has a function of an electronic shutter for discharging an accumulated electric charge in order to adjust the quantity of received light. Moreover, the arithmetic processing means can drive the light emitting means within a period of time during which the electronic shutter is stopped and the two-dimensional light receiving means is accumulating an electric charge.

BRIEF DESCRIPTION OF THE DRAWINGS

Diagrams illustrating embodiments of the present invention will be listed as below.

DESCRIPTION OF THE PREFERRED EMBODIMENTS

Embodiments of the present invention will be described with reference to drawings as below.

First Embodiment

Figure 1:
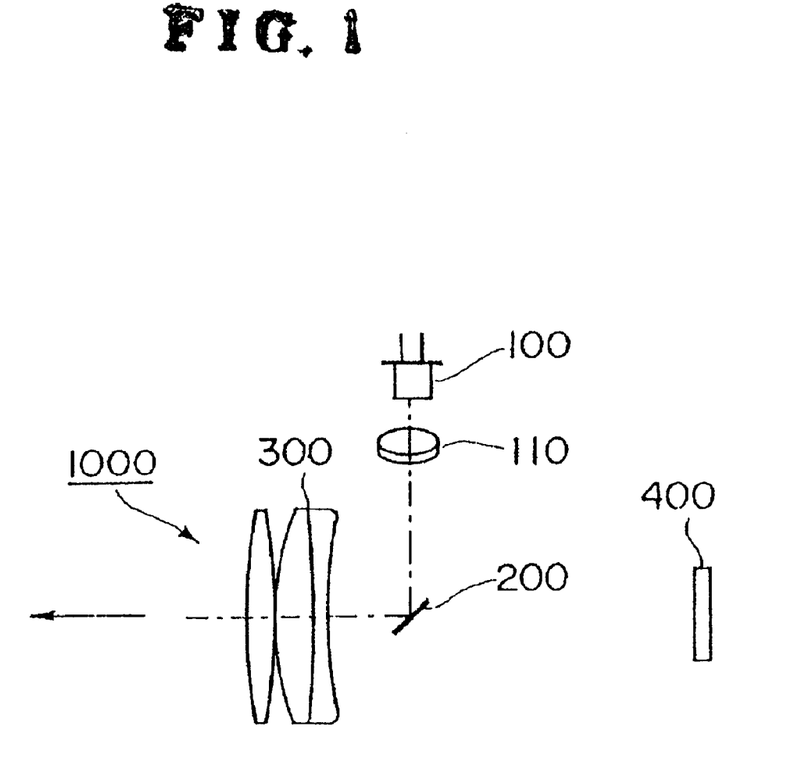
FIG. 1 is a diagram illustrating an optical configuration of a position detection device according to a first embodiment.

FIG. 1 illustrates an optical configuration of a position detection device 1000 according to a first embodiment. The position detection device 1000 comprises a luminous element 100, a first condensing lens 110, a first mirror 200, an objective lens 300, and an area sensor 400.

The luminous element 100 is equivalent to a light emitting means, and emits light toward a reflector (for example, a corner cube (prism)) placed at a target position. A proper luminous element such as a pulsed laser diode (PLD) can be used. It is to be noted that the corner cube (prism) corresponds to a target object.

The first condensing lens 110 sends out light, which comes from the luminous element 100, to the objective lens 300 through the first mirror 200.

The first mirror 200 reflects light coming from the luminous element 100, and directs emitted light toward the corner cube (prism) through the objective lens 300.

The objective lens 300 sends out the emitted light toward the corner cube (prism) as luminous flux expanding to some extent.

The area sensor 400 is a two-dimensional CCD sensor. The area sensor 400 receives reflected light, which has been reflected by the corner cube (prism), to detect a target position. The area sensor 400 is not limited to the CCD sensors. If a sensor has a built-in electronic shutter function and is capable of receiving a two-dimensional image, etc., any sensor can be used as the area sensor 400.

It is to be noted that the first condensing lens 110, the first mirror 200, and the objective lens 300 correspond to a light sending means.

Figure 2:
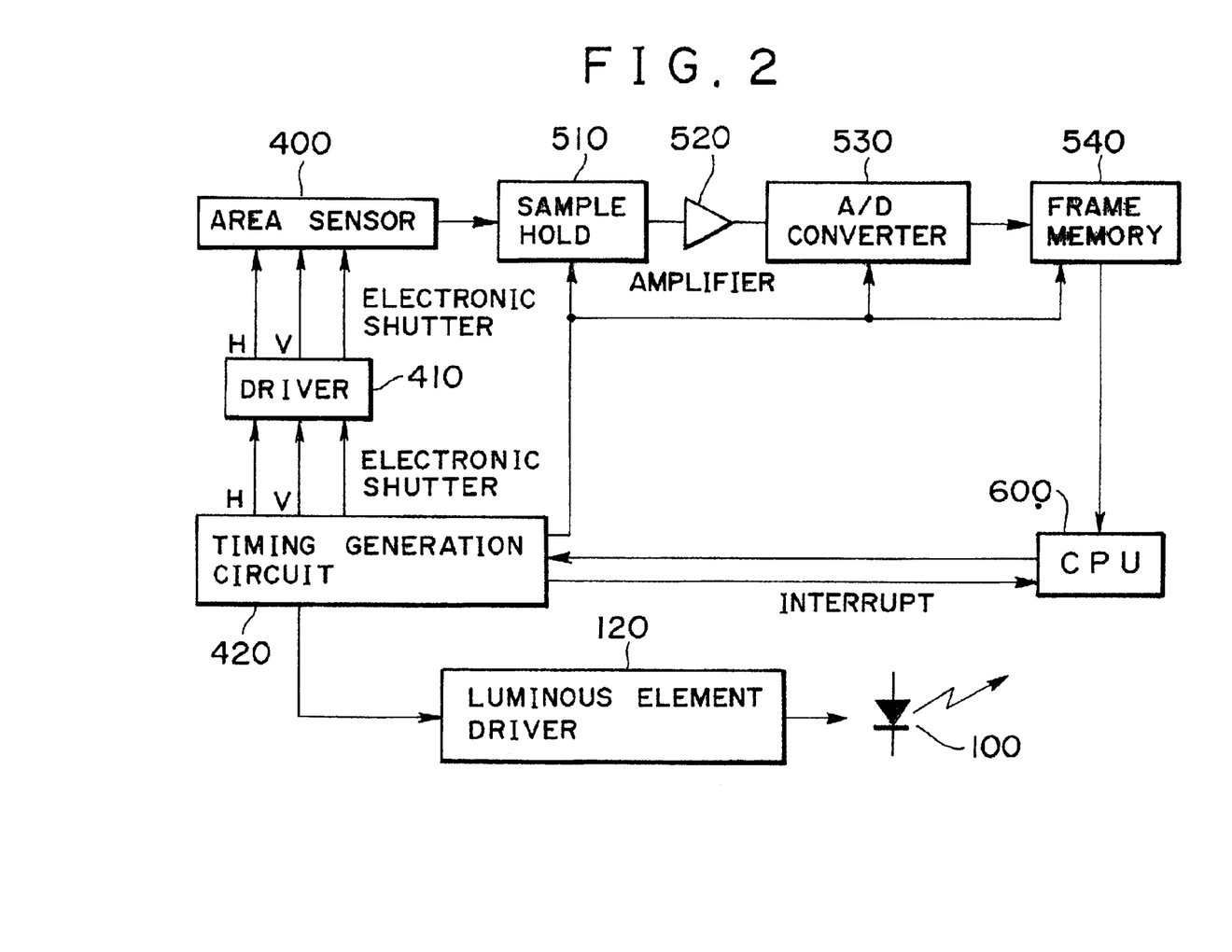
FIG. 2 is a diagram illustrating an electric configuration of a position detection device according to the first embodiment.

FIG. 2 illustrates an electric configuration of the position detection device 1000 according to the first embodiment. The position detection device 1000 comprises the luminous element 100, a luminous element driver 120, the area sensor 400, an area sensor driver 410, a timing generation circuit 420, a sample hold 510, a first amplifier 520, an A/D converter 530, a frame memory 540, and a CPU 600.

The luminous element driver 120 drives the luminous element 100 according to a timing signal of the timing generation circuit 420. The area sensor driver 410 supplies a vertical synchronizing signal, a horizontal synchronizing signal, and the like, which are required by the area sensor 400 to form a light receiving signal, to operate an electronic shutter, and the like.

The sample hold 510 samples and holds a light receiving signal, which comes from the area sensor 400, according to a timing signal of the timing generation circuit 420.

The first amplifier 520 is used for amplifying a signal that has been sampled and held in the sample hold 510. The amplified signal is converted into a digital signal by the A/D converter 530 before the digital signal is stored in a frame memory 540.

The CPU 600 corresponds to an arithmetic processing means, which includes a RAM, and a ROM. The CPU 600 performs various kinds of processing, and controls the position detection device 1000 as a whole.

Figure 3:
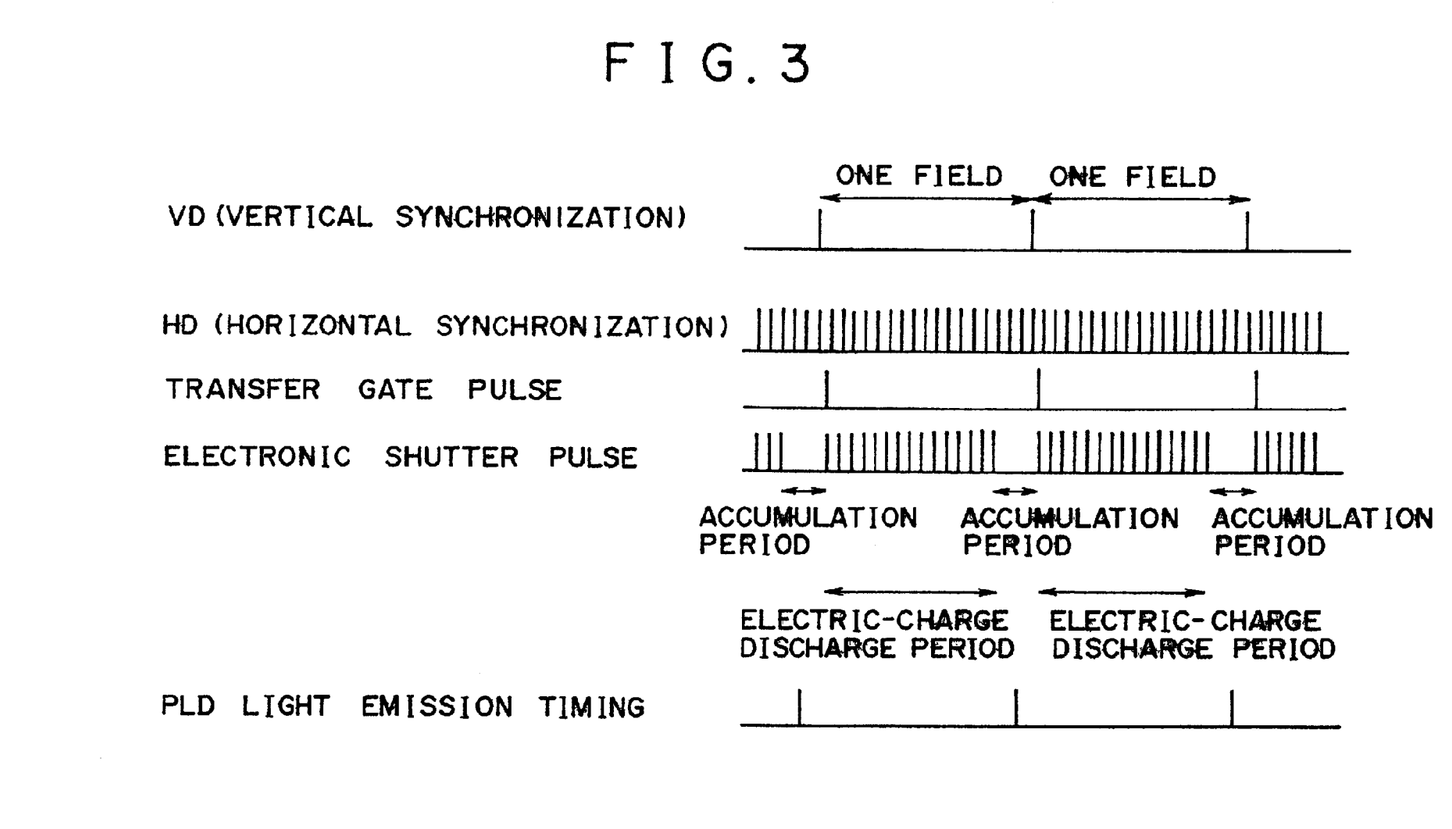
FIG. 3 is a diagram illustrating an electronic signal of a position detection device according to the first embodiment.

In the next place, an electronic signal will be described in detail with reference to FIG. 3.

The area sensor 400 is a two-dimensional light receiving sensor, and converts incident light into an electric charge.

Concerning this area sensor 400, as is the case with a general image sensor using a typical interlaced method, two fields (an odd number field and an even number field) constitute one screen (one frame). An electric charge, which has been received by the area sensor 400, is transferred with a vertical synchronizing signal (VD) and a horizontal synchronizing signal (HD). The vertical synchronizing signal (VD) determines one field of a screen. The horizontal synchronizing signal (HD) is a signal for determining transfer equivalent to one horizontal line. In this case, the interlaced method was adopted for description. However, another method in which all pixels are read, a frame transfer method, or the like, can also be adopted for the area sensor 400.

The electronic shutter has a function of outputting and discharging an electric charge that has been accumulated by the area sensor 400. For example, operation in one field for a given period of time causes an electric charge to be discharged. A period during which operation of the electronic shutter is stopped is an accumulation period of incident light.

The area sensor 400 receives outside light except reflected light, and during a light receiving period in one field, it becomes noise light. Discharging noise light facilitates detection of reflected light.

The CPU 600 controls the area sensor driver 410 through the timing generation circuit 420, and thereby controls an electronic shutter that adjusts a light receiving signal of the area sensor 400. To be more specific, while an electronic shutter pulse is supplied, it is possible to discharge an accumulated electric charge of the area sensor 400. This electronic shutter is configured to input a pulse for an arbitrary period of time at constant intervals after a transfer gate pulse as the need arises.

As a result of it, while inputting an electronic shutter pulse, the two-dimensional CCD sensor discharges an electric charge. After the electronic shutter is stopped, the two-dimensional CCD sensor can accumulate an electric charge until the next transfer gate pulse comes. Then, the CPU 600 can detect a position of a corner cube (prism) from a light receiving position of the two-dimensional CCD sensor.

When an electronic shutter pulse is stopped, the CPU 600 can control the luminous element driver 120 through the timing generation circuit 420 to drive the luminous element 100. To be more specific, while an electronic shutter pulse is stopped and the two-dimensional CCD sensor is accumulating an electric charge, the CPU 600 provide the luminous element 100 with timing of light emission so that the luminous element 100 emits light. As a result, the following effects are produced: because a period during which an electronic shutter pulse is stopped (accumulation period) can be shortened, the accumulated quantity of outside light can be reduced, resulting in improvement in a S/N ratio of signal light, and thereby a practically used distance to a target position can be extended.

It is to be noted that besides the functions described above, the CPU 600 has the following functions: switching ON/OFF the luminous element 100; setting the number of pulses of the luminous element 100; setting time of the electronic shutter; and the like. For example, after stopping the electronic shutter, during an accumulation period of the two-dimensional CCD sensor (while an electric charge is being accumulated), the quantity of received light can be controlled by changing the number of times of light emission of the light emitting means 100.

Second Embodiment

Figure 4:
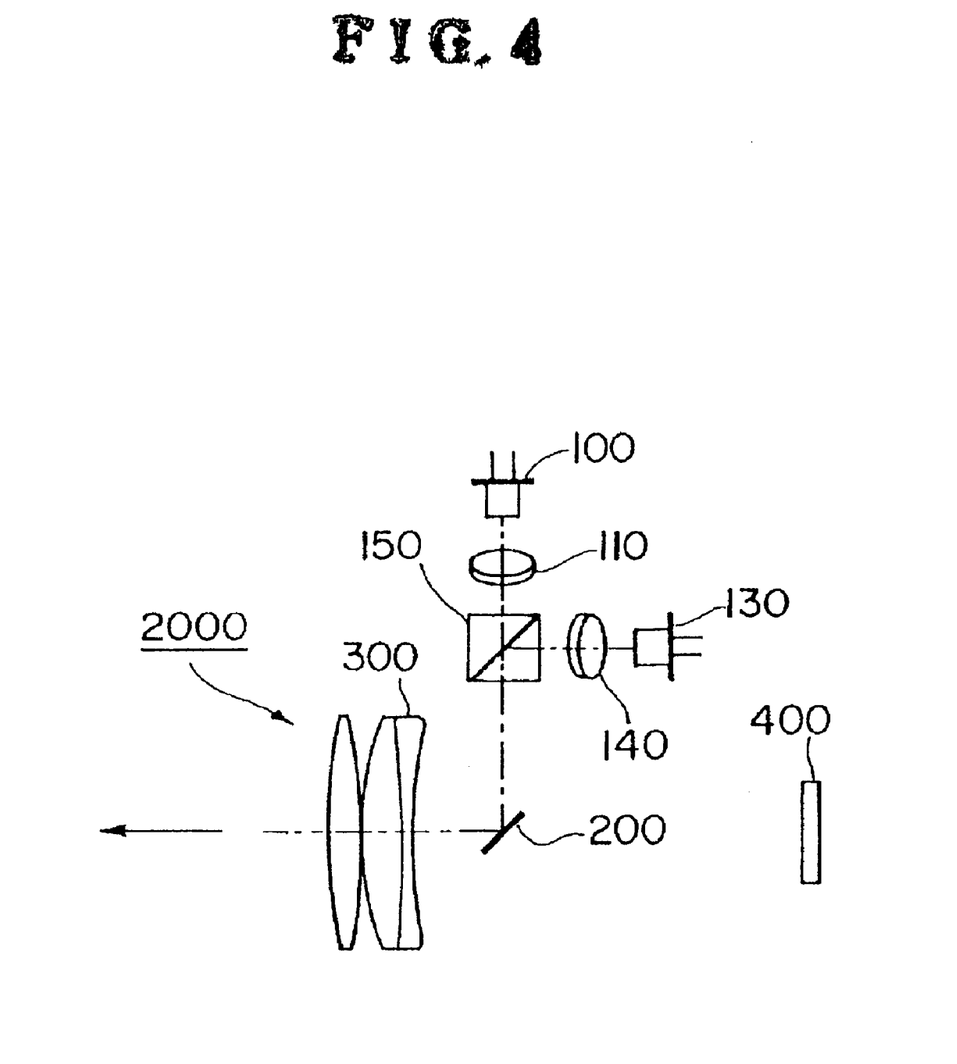
FIG. 4 is a diagram illustrating an optical configuration of a position detection device according to a second embodiment.

FIG. 4 illustrates an optical configuration of a position detection device 2000 according to a second embodiment.

The position detection device 2000 comprises the luminous element 100, a first condensing lens 110, a communication luminous element 130, a second condensing lens 140, a second half mirror 150, a first mirror 200, an objective lens 300, and an area sensor 400.

The communication luminous element 130 is a light source used for communication by means of light. A proper light source such as a laser diode is used. The second condensing lens 140 sends out light, which comes from the communication luminous element 130, to the objective lens 300 through the first half mirror 150 and the first mirror 200.

The first half mirror 150 transmits light from the luminous element 100, and reflects light from the communication luminous element 130.

Because other parts of the configuration of the second embodiment are similar to those of the first embodiment, description will be omitted.

It is to be noted that if a laser diode (LD) is used for the luminous element 100 and the communication luminous element 130, a polarizing mirror can be used as a substitute for the first half mirror 150, and that if a wavelength is different, a dichroic mirror can be used.

Figure 5:
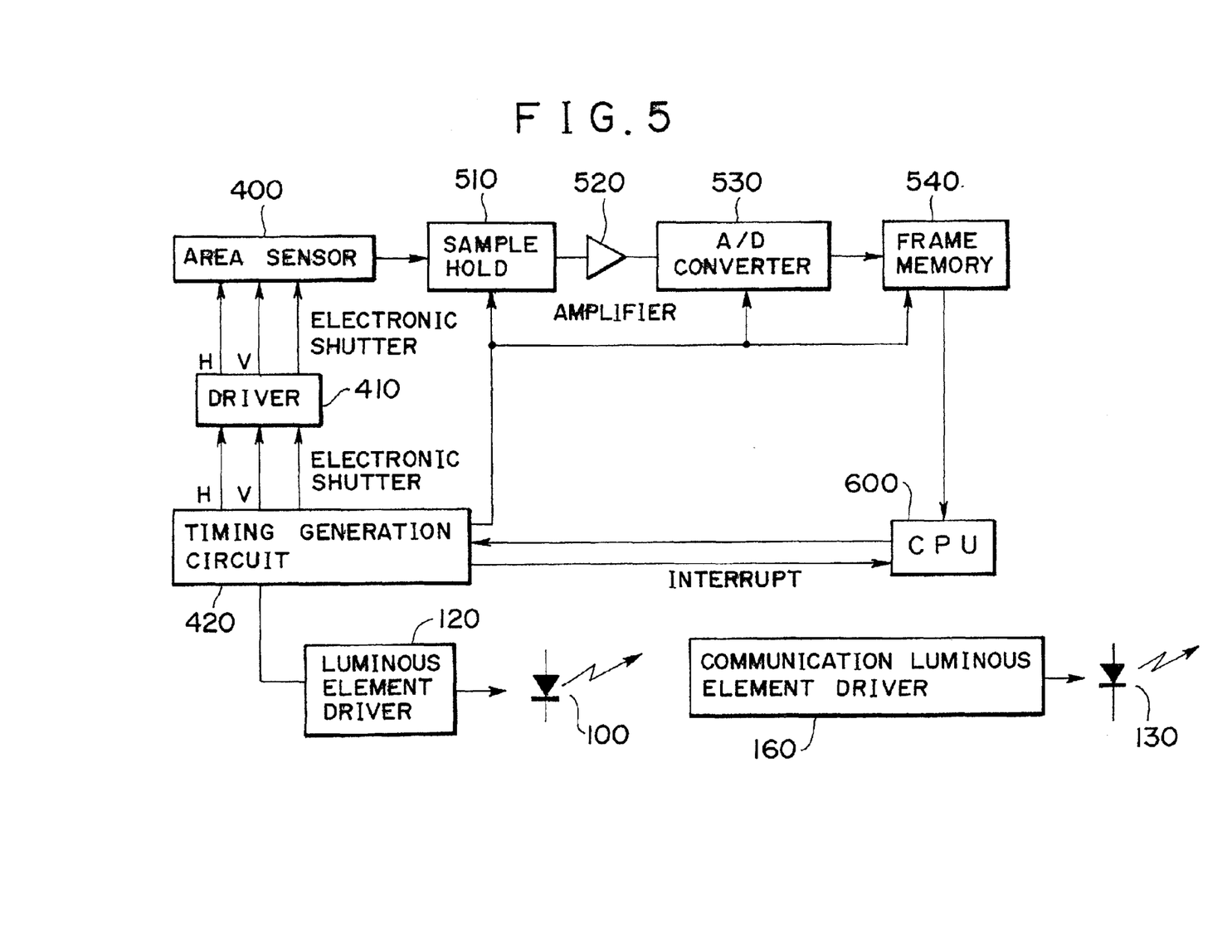
FIG. 5 is a diagram illustrating an electric configuration of a position detection device according to the second embodiment.

FIG. 5 illustrates an electric configuration of the position detection device 2000 according to the second embodiment. The position detection device 2000 comprises the luminous element 100, a luminous element driver 120, the communication luminous element 130, a communication luminous element driver 160, the area sensor 400, an area sensor driver 410, a timing generation circuit 420, a sample hold 510, an amplifier 520, an A/D converter 530, a frame memory 540, and a CPU 600.

The CPU 600 supplies communication data for communication to the communication luminous element driver 160. As a result, the communication luminous element 130 emits light, which is equivalent to communication data, to perform optical communication.

Figure 6:
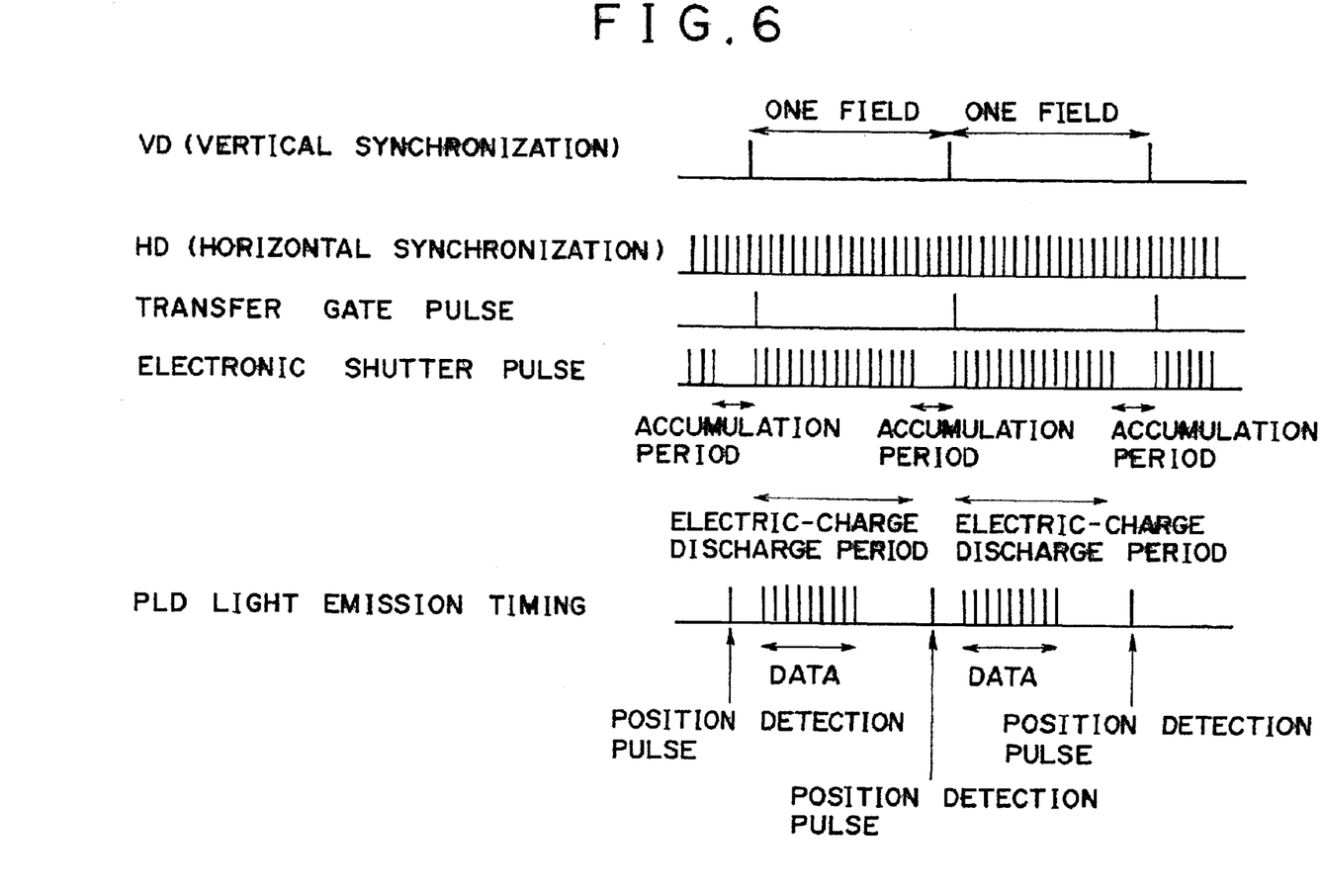
FIG. 6 is a diagram illustrating an electronic signal of a position detection device according to the second embodiment.

In this connection, timing of driving the communication luminous element driver by the CPU 600 to perform optical communication is, as shown in FIG. 6, when an electronic shutter is operated so that the two-dimensional CCD sensor discharges an electric charge. As a result, the following effects are produced: the accumulated quantity of outside light can be reduced, resulting in improvement in a S/N ratio of signal light, and thereby a practically used distance to a target position can be extended; and in addition to it, communication can be performed without influencing each other.

It is to be noted that the communication luminous element 130 can also serve as the luminous element 100, and that the communication luminous element driver 160 can also serve as the luminous element driver 120. In this case, the first half mirror 150 is not required.

Because other parts of the configuration of the second embodiment and their actions are similar to those of the first embodiment, description will be omitted.

Third Embodiment

Figure 7:
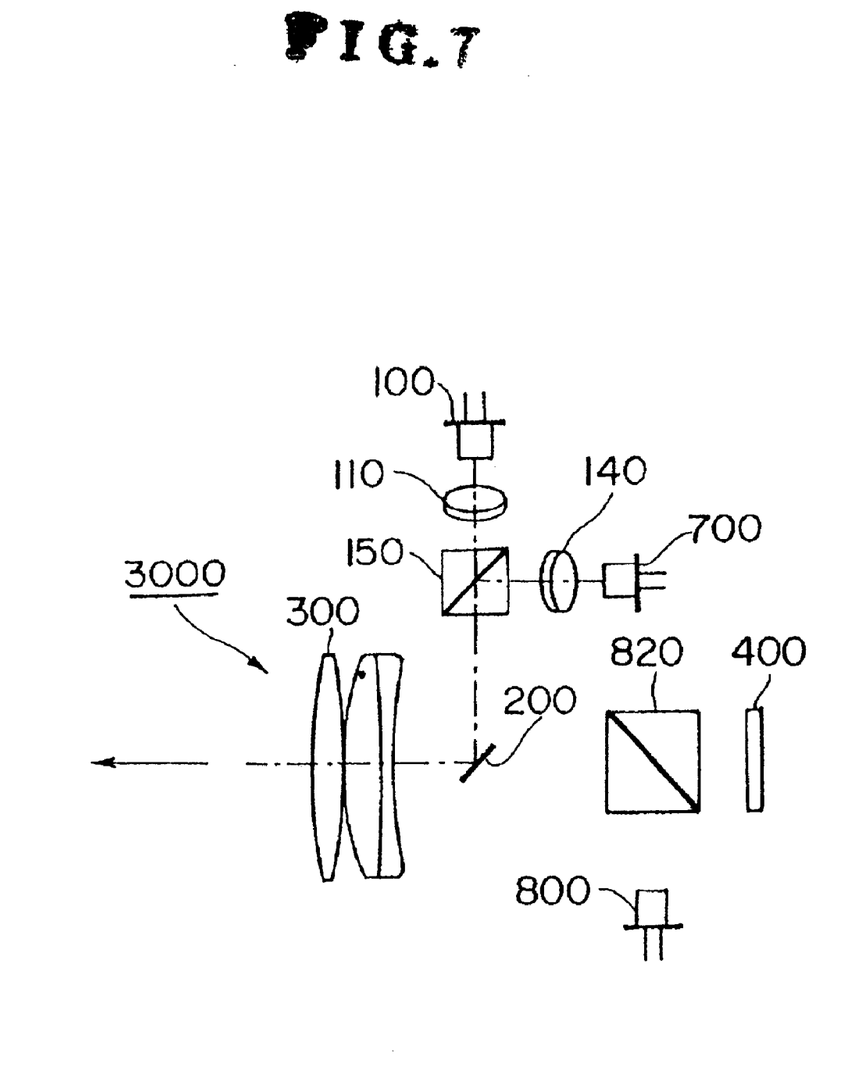
FIG. 7 is a diagram illustrating an optical configuration of a position detection device according to a third embodiment.

FIG. 7 illustrates an optical configuration of a position detection device 3000 according to a third embodiment. The position detection device 3000 comprises a luminous element 100, a first condensing lens 110, a distance-measuring luminous element 700, a second condensing lens 140, a first half mirror 150, a first mirror 200, an objective lens 300, a distance-measuring light receiving element 800, a second half mirror 820, and an area sensor 400.

The distance-measuring luminous element 700 and the distance-measuring light receiving element 800 constitute an optical range finder for measuring distance by means of light. The distance-measuring luminous element 700 is placed instead at a position where there was the communication luminous element 130 in the second embodiment. This third embodiment realizes a function equivalent to the optical range finder by the CPU 600, a pulse delay time measuring means 900, and the like.

The distance-measuring light receiving element 800 is used for receiving reflected light that has been reflected by a corner cube (prism) placed at a target position, etc., after the light has been emitted by the distance-measuring luminous element 700.

The second half mirror 820 is used for the following: transmitting a position detection pulse, which has been emitted from the luminous element 100, through this half mirror to send the transmitted position detection pulse to the area sensor 400; and reflecting a distance-measuring pulse, which has been emitted from the distance-measuring luminous element 700, to send the reflected distance-measuring pulse to the distance-measuring light receiving element 800. If a wavelength for tracking use is different from that for distance measuring use, it is desirable to use a dichroic prism instead of the second half mirror 820.

Because other parts of the configuration of the third embodiment are similar to those of the first embodiment and the second embodiment, description will be omitted.

Figure 8:
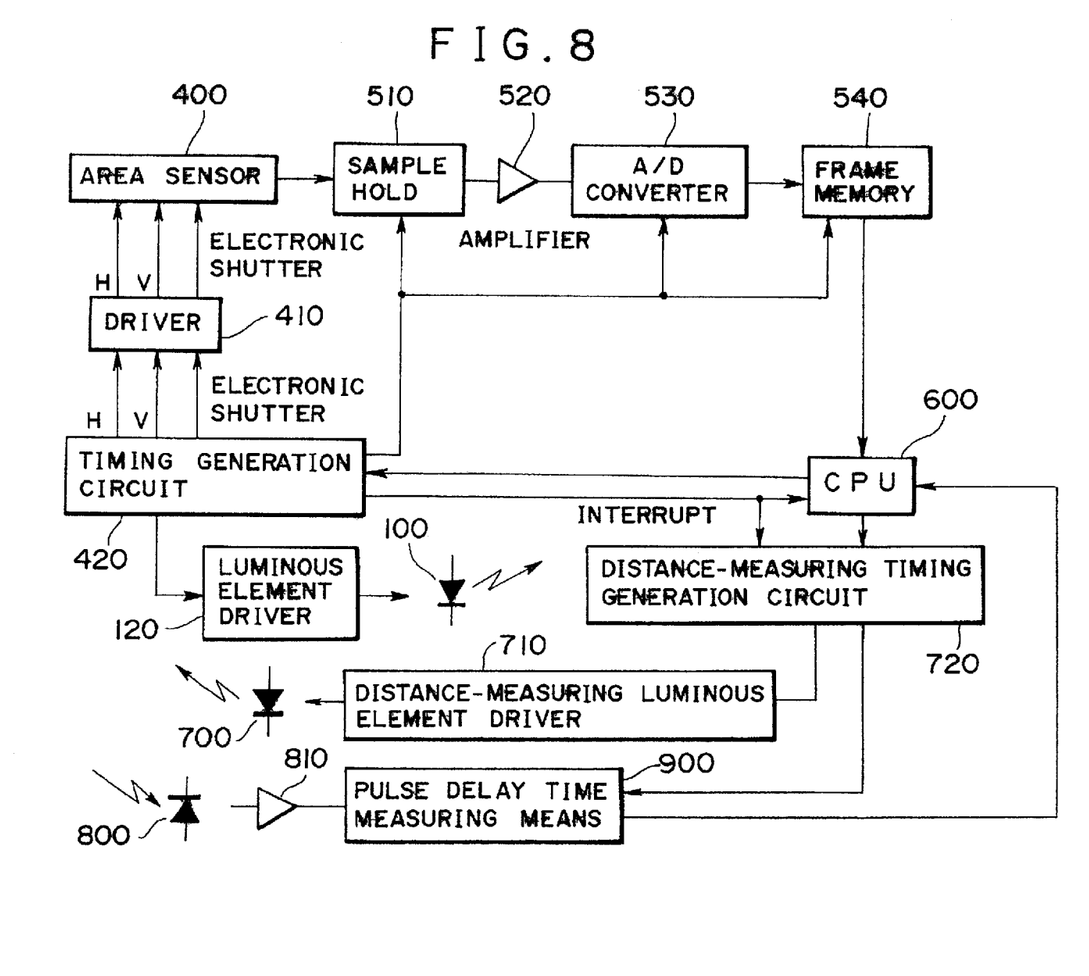
FIG. 8 is a diagram illustrating an electric configuration of a position detection device according to the third embodiment.

FIG. 8 illustrates an electric configuration of the position detection device 3000 according to the third embodiment. The position detection device 3000 comprises the luminous element 100, a luminous element driver 120, the area sensor 400, an area sensor driver 410, a timing generation circuit 420, a sample hold 510, a first amplifier 520, an A/D converter 530, a frame memory 540, the CPU 600, the distance-measuring luminous element 700, a distance-measuring luminous element driver 710, a distance-measuring timing generation circuit 720, the distance-measuring light receiving element 800, a second amplifier 810, and the pulse delay time measuring means 900.

The CPU 600 drives the distance-measuring luminous element driver 710 according to a timing signal of the distance-measuring timing generation circuit 720 so that the distance-measuring luminous element 700 emits light. The reflected light, which has been reflected by the corner cube (prism) placed at a target position, etc., is received by the distance-measuring light receiving element 800. A light receiving signal is amplified by the second amplifier 810 before delay time is measured by the pulse delay time measuring means 900. After that, a distance to the target position is calculated by the CPU 600.

Figure 9:
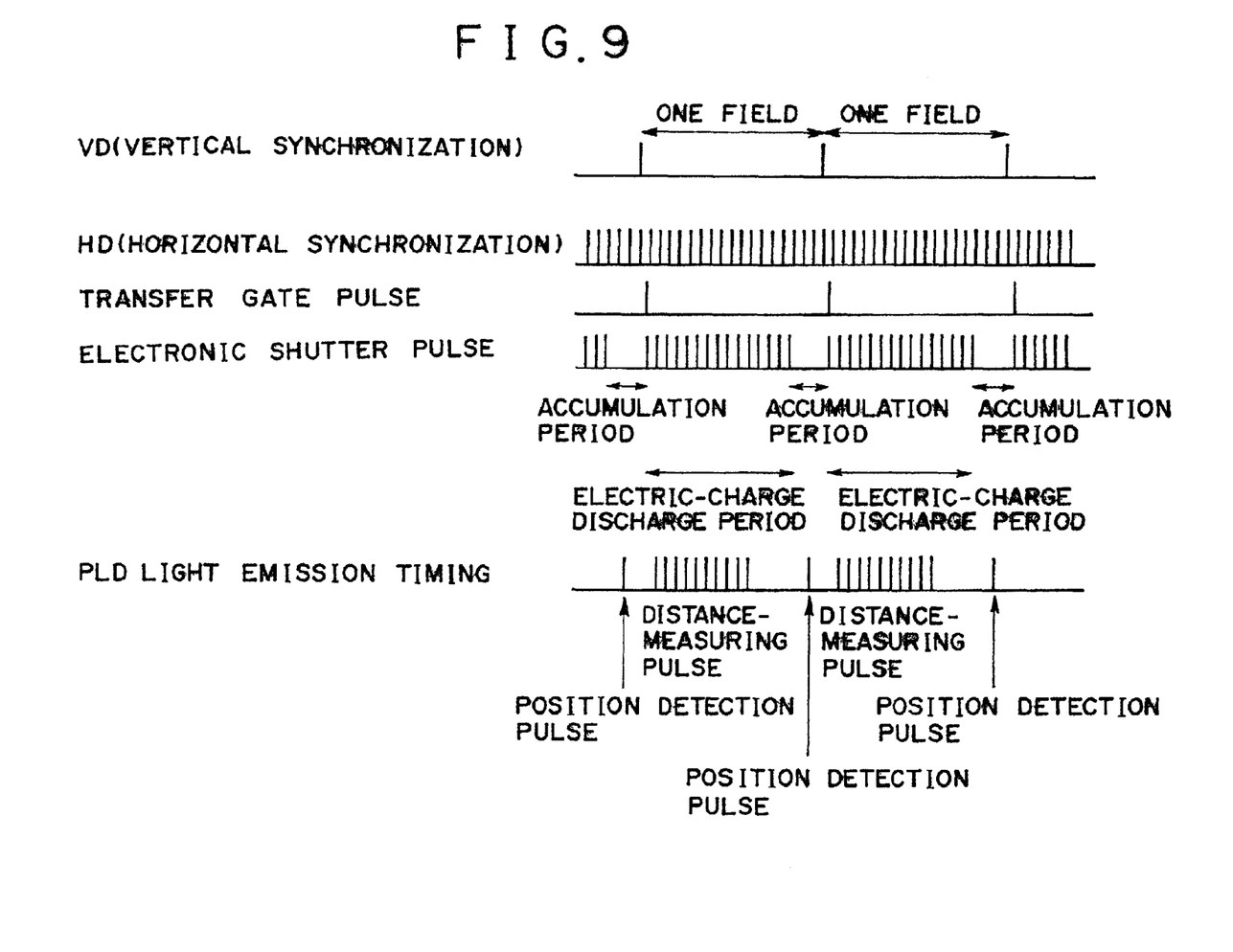
FIG. 9 is a diagram illustrating an electronic signal of a position detection device according to the third embodiment.

In this connection, timing of driving the distance-measuring luminous element driver by the CPU 600 to perform distance measurement is, as shown in FIG. 9, when an electronic shutter is operated so that the two-dimensional CCD sensor discharges an electric charge. As a result, the following effects are produced: the accumulated quantity of outside light can be reduced, resulting in improvement in a S/N ratio of signal light, and thereby a practically used distance to a target position can be extended; and in addition to it, position detection and distance measurement can be performed without influencing each other.

It is to be noted that the distance-measuring luminous element 700 can also serve as the luminous element 100, and that the distance-measuring luminous element driver can also serve as the luminous element driver 120. Because other parts of the configuration of the third embodiment and their actions are similar to those of the first embodiment and the second embodiment, description will be omitted.

The present invention has the configurations as described above, and is devised to perform the following: the light sending means sends out emitted light, which has been emitted from the light emitting means, to a target object; the two-dimensional light receiving means receives reflected light coming from the target object, and converts the reflected light into an electric charge; and the arithmetic processing means determines a position of the target object on the basis of a light receiving signal from the two-dimensional light receiving means. In addition, the two-dimensional light receiving means has a function of an electronic shutter for discharging an accumulated electric charge in order to adjust the quantity of received light. Moreover, the arithmetic processing means can drive the light emitting means within a period of time during which the electronic shutter is stopped and the two-dimensional light receiving means is accumulating an electric charge. Therefore, the following effects are produced: the quantity of accumulated outside light can be reduced efficiently, resulting in improvement in a S/N ratio of signal light, and thereby a practically used distance to a target position can be extended.

Furthermore, the present invention has-an excellent effect of enabling communication and distance measuring within a period of time during which an electronic shutter is being operated.

What is claimed is:

1. A position detection device, comprising:

a light emitting means;

a light sending means for sending out emitted light, which comes from the light emitting means, to a target object;

a two-dimensional light receiving means for receiving reflected light coming from the target object to convert the reflected light into an electric charge; and an arithmetic processing means that determines a position of the target object on the basis of a light receiving signal from the two-dimensional light receiving means;

wherein:

the two-dimensional light receiving means has a function of an electronic shutter for discharging an accumulated electric charge in order to adjust the quantity of received light; and the arithmetic processing means drives the light emitting means within a period of time during which the electronic shutter is stopped and the two-dimensional light receiving means is accumulating an electric charge.

2. A position detection device according to claim 1, wherein:

the quantity of received light is controlled by changing the number of times of light emission by the light emitting means within a period of time during which an electric charge is being accumulated.

3. A position detection device according to claim 1 or 2, wherein:

communication is performed within a period of time during which the electronic shutter is operated and an accumulated electric charge is being discharged.

4. A position detection device according to claim 1 or 2, wherein:

measurement of a distance to the target object is performed within a period of time during which the electronic shutter is operated and an accumulated electric charge is being discharged.

5. A position detection device according to claim 3, wherein:

a light source for the light emitting means is the same as a light source for communication.

6. A position detection device according to claim 4, wherein:

a light source for the light emitting means is the same as a light source for distance measuring.

7. A position detection device, comprising:

a light emitting means;

a light sending means for sending out emitted light, which comes from the light emitting means, to a target object;

a two-dimensional light receiving means for receiving reflected light coming from the target object to convert the reflected light into an electric charge; and an arithmetic processing means that determines a position of the target object on the basis of a light receiving signal from the two-dimensional light receiving means;

wherein:

the two-dimensional light receiving means has a function of an electronic shutter for discharging an accumulated electric charge in order to adjust the quantity of received light; and the arithmetic processing means stops the electronic shutter within a predetermined period of time in one field, and accumulates reflected light of the light emitting means, which emits light in synchronization with the stop operation, to detect a position.

8. A position detection device according to claim 7, wherein:

while the electronic shutter is operating in one field, the light emitting means is used as a light source for communication.

9. A position detection device according to claim 7, further comprising a light receiving means for distance measuring, wherein while the electronic shutter is operating in one field, the light emitting means is used as a light source for distance measuring.

* * * * *